US006259785B1

(12) United States Patent
Shaffer et al.

(10) Patent No.: US 6,259,785 B1
(45) Date of Patent: Jul. 10, 2001

(54) SYSTEM AND METHOD FOR DYNAMICALLY ALTERING DIGITAL VOICE MIXING LOCATION IN ACD SILENT MONITORING

(75) Inventors: Shmuel Shaffer, Palo Alto; William Joseph Beyda, Cupertino; Mark Skrzynski, Capitola; Florin M. Gheorghiu, San Jose, all of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/135,980

(22) Filed: Aug. 17, 1998

(51) Int. Cl.[7] .............................. H04M 3/00; H04M 5/00
(52) U.S. Cl. .................... 379/265; 379/34; 379/88.17; 379/100.05; 379/258; 370/352; 370/468
(58) Field of Search ................... 379/258, 265, 379/266, 309, 100.05, 34, 88.17, 88.13, 223, 900, 908; 370/352, 356, 468

(56) References Cited

U.S. PATENT DOCUMENTS

| 5,696,811 | 12/1997 | Maloney et al. | 379/34 |
| 5,751,339 | * 5/1998 | Aramaki et al. | 348/17 |
| 5,757,889 | * 5/1998 | Ohtake | 379/34 |

(List continued on next page.)

FOREIGN PATENT DOCUMENTS

| 0 644 510 A2 | 3/1995 | (EP) . |
| 0 793 374 A2 | 9/1997 | (EP) . |
| WO 92 07318 A1 | 4/1992 | (WO) . |

OTHER PUBLICATIONS

Kamal, Samir, "Integration of Host and ACD Applications", *Annual Review of Communications* XP00028487, p. 201, left–hand column, line 25–line 52, pp. 203, left–hand column, line 13–right–hand column, line 6.

Sulkin, Allan, "Building the ACD–Lan Connection", *Business Communications Review*, US, Hinsdale, IL, vol. 26, Nr. 6 pp. 35–37 XP002054724 whole document.

(List continued on next page.)

*Primary Examiner*—Fan Tsang

(57) ABSTRACT

A method and system for enabling dynamic location of a voice and video mixing site in a telephony-over-LAN (TOL) automatic call distributor (ACD) system includes establishing a first call between an ACD agent terminal and a customer terminal, wherein the first call includes first voice data transmitted from the agent terminal and second voice data transmitted from the customer terminal. Upon receiving a monitoring session request from an ACD supervisor terminal, agent processor monitoring circuitry determines whether sufficient agent processor resources are available to mix voice, and if applicable, video data samples. If sufficient agent processor resources are available, an agent terminal call control cooperates with a supervisor terminal call control to establish a first monitoring call. The agent call control monitors the first call for simultaneously transmitted agent and customer voice and video data. A voice/video mixer integrates the simultaneously transmitted agent and customer voice and video data which are transmitted over the first monitoring call to the supervisor terminal. If sufficient agent processor resources are not available, the agent call control determines if sufficient network bandwidth is available to establish second and third monitoring calls. If sufficient bandwidth is available, the agent call control establishes the second and third monitoring calls over which the first and second voice and video data are transmitted. The monitoring of the agent processor resource level is continuous throughout a monitoring session. If sufficient resources are available in the agent terminal, the voice data mixing is performed at the agent terminal.

19 Claims, 5 Drawing Sheets

U.S. PATENT DOCUMENTS 5,764,728 * 6/1998 Ala et al. .............................. 379/35

5,790,635 * 8/1998 Dezonno .............................. 379/34

OTHER PUBLICATIONS

European Search Report, Application No. EP 99 11 2085, Date of completion of search: Apr. 18, 2000.

* cited by examiner

SYSTEM AND METHOD FOR DYNAMICALLY ALTERING DIGITAL VOICE MIXING LOCATION IN ACD SILENT MONITORING

BACKGROUND OF THE INVENTION

The present invention relates generally to a system and method for providing automatic call distributor (ACD) functions in a data network environment and, more specifically, to a system and method for dynamically altering a location for mixing digital voice samples during ACD silent call monitoring.

ACD systems are employed in a wide range of customer service environments and provide ACD users with an economical and powerful means for providing customer service. Calls can be automatically routed to ACD agents who possess the skills required for a particular call. Management of a customer service department is facilitated by the ability of a manager or supervisor to monitor calls directed to agents and to analyze performance of the agents. The supervisor, utilizing a single terminal, is able to conveniently switch among different ACD agent calls and thereby directly monitor the job performance of a large number of ACD agents.

An example of an ACD for providing customer support for computers and peripheral devices might include a greeting which requires the customer to select from a choice of computer related questions regarding printer malfunctions, an inability to run particular applications on a computer, and software installation on a computer. The option which the customer selects causes the ACD system to transfer the call to a particular agent whose skills match the needs of the customer, as indicated by the selection. Once the call has been answered by an ACD agent, a supervisor can silently monitor the call to evaluate the agent's performance and make recommendations.

With the rapid development of computer network communications capabilities, many of the functions provided by an ACD system can now be performed in a distributed network environment. However, certain obstacles remain to providing effective ACD functionality in a distributed network environment. Specifically, the dominant protocols for voice-over-data-network telephony, for instance the H.323 standard of the International Telecommunication Union, do not provide an effective means for silently monitoring a call.

A voice-over-data-network call, for instance a telephony-over-LAN (TOL) call, includes a first voice data stream transmitted from an agent terminal to a customer terminal and a second voice data stream transmitted from the customer terminal to the agent terminal. One known method for enabling a supervisor terminal to monitor the call includes establishing a monitoring call between the agent terminal and the supervisor terminal. The agent terminal utilizes a digital signal processor (DSP) to mix voice samples from the first voice data stream with voice samples from the second voice data stream into a third voice data stream which is transmitted to the supervisor terminal over the monitoring call.

The processor requirements associated with mixing voice samples are substantial and can adversely affect other applications running on the agent terminal. Requiring all agent terminals to have sufficient DSP capabilities to mix the voice samples is often impractical, because of the cost associated with DSP resources required for mixing voice samples. The cost of the ACD system becomes significantly greater if each agent terminal must include the sample-mixing sophistication.

What is needed is a system and method for efficient silent monitoring of a voice-over-data-network call.

SUMMARY OF THE INVENTION

The present invention provides a system and method for efficient silent call monitoring of a first voice-over-data-network call. The system includes an agent terminal that is enabled to establish the first call and to cooperate with a supervisor terminal to establish a monitoring voice-over-data-network call, wherein a voice data mixing location for the monitoring call is dynamically alterable according to a level of available processor resources in the agent terminal. The first call includes first voice data transmitted from the agent terminal to a customer terminal and second voice data transmitted from the customer terminal to the agent terminal. In a monitoring session, it is important to transmit portions of the first and second voice data, which were simultaneously transmitted in the first call as a result of simultaneous statements, to a supervisor terminal in such a manner as to minimize transmission delay and to efficiently utilize network resources. To this end, the simultaneously transmitted first and second data portions are mixed either at the agent terminal if sufficient processor resources are available in the agent terminal, or at the supervisor terminal if insufficient resources are available in the agent terminal.

In a preferred embodiment, the system and method are practiced in a telephony-over-LAN environment, wherein the local area network (LAN) supports a distributed ACD system. The agent terminal is an ACD agent terminal which handles incoming calls from customers, such as from the customer terminal, and the supervisor terminal is utilized by an ACD supervisor to oversee ACD system operations by, for example, monitoring ACD calls. After the agent terminal and the customer terminal establish the first call, the supervisor terminal transmits a request to establish a monitoring session for the purpose of monitoring the agent's performance in handling the first call. Processor monitoring circuitry in the agent terminal determines whether the agent terminal has available to it a level of processor resources above a minimum threshold required for performing digitized voice data mixing. There is a preference in the system to assign the voice data mixing function to the agent terminal, if possible, to conserve network bandwidth and to avoid unnecessarily tying up network processor resources.

If sufficient processor resources are available to the agent terminal, the agent terminal cooperates with the supervisor terminal to establish a first monitoring call. The agent terminal inspects time stamps of data packets in the first call to determine if the time stamps indicate that a quantity of first voice data was transmitted from the agent terminal at the same time that a quantity of second voice data was transmitted from the customer terminal. If the first voice data was transmitted at the same time as the second voice data, this indicates that the agent and customer were talking simultaneously. A voice mixer, which is enabled upon detection of the processing resource level above the minimum threshold, integrates the simultaneously transmitted first and second voice data to form mixed voice data for transmission over the first monitoring call. For applications that include video transmissions, a voice/video mixer is utilized.

After the first monitoring call is established, the agent terminal's processor monitoring circuitry continues to monitor the level of available processor resources to determine if sufficient processor resources continue to be available to support the mixing capability for the monitoring call. The resources might fall below the minimum threshold because the agent terminal is required to run other applications which drain processor resources, or the processor requirements for the call might increase as the result, for example, of an addition of an agent video stream and a customer video stream to the first call.

If the available processor resource level in the agent terminal falls below the minimum threshold, the agent terminal determines whether sufficient network bandwidth is available to establish an auxiliary monitoring call. If sufficient bandwidth is available, the call control of the agent terminal establishes the auxiliary monitoring call, provides notification to the supervisor terminal to enable a voice/video mixer in the supervisor terminal, and then disables the agent terminal voice/video mixer. The agent call control transmits the unmixed first and second voice data over the first monitoring call and auxiliary monitoring call. In this manner, the agent terminal is able to continue the monitoring session despite falling below the minimum threshold of available processor resources during the first monitoring call.

For occasions in which there is not sufficient bandwidth to support establishing the auxiliary call, the agent terminal might be required to terminate the monitoring call. If the network bandwidth insufficiency is the result of local network traffic on a network segment on which the supervisor terminal resides, the agent terminal determines whether another network device, such as a multipoint call unit (MCU) is available to mix the first and second voice data. MCU availability allows the agent terminal to transmit the first and second voice data to the MCU over two calls and allows the MCU to transmit mixed voice samples to the supervisor terminal over a single call.

When the supervisor terminal first requests the monitoring session, if it is determined that the agent terminal does not have sufficient processor resources to mix the first and second voice data, the call control of the agent terminal determines the sufficiency of available network bandwidth to establish second and third monitoring calls over which to transmit the first and second voice data. If insufficient bandwidth is available to establish the two monitoring calls, the agent terminal determines the feasibility of employing the MCU to perform the mixing. When MCU mixing is feasible, the first and second voice data are transmitted to the MCU for mixing and for transmission to the supervisor terminal. When MCU mixing is not feasible, the agent terminal rejects the monitoring session request.

If sufficient bandwidth is available to establish the second and third monitoring calls, the calls are established and the first and second voice data are transmitted to the supervisor terminal in an unmixed format. The supervisor terminal performs the mixing locally; or, upon detecting that the supervisor terminal has insufficient processor resources to perform the mixing, the supervisor terminal transmits the first and second voice data to an MCU for mixing. The agent processor monitoring circuitry continuously monitors the agent terminal's available processing resource level during the second and third calls to determine if the available processing resource level exceeds the minimum threshold. When the minimum threshold is exceeded, the agent voice/video mixer is enabled and the first call is monitored for simultaneously transmitted first and second voice data. The agent voice/video mixer integrates simultaneously transmitted first and second voice data and the mixed voice samples are transmitted over either the second or third monitoring call to the supervisor terminal.

DETAILED DESCRIPTION

Figure 1:
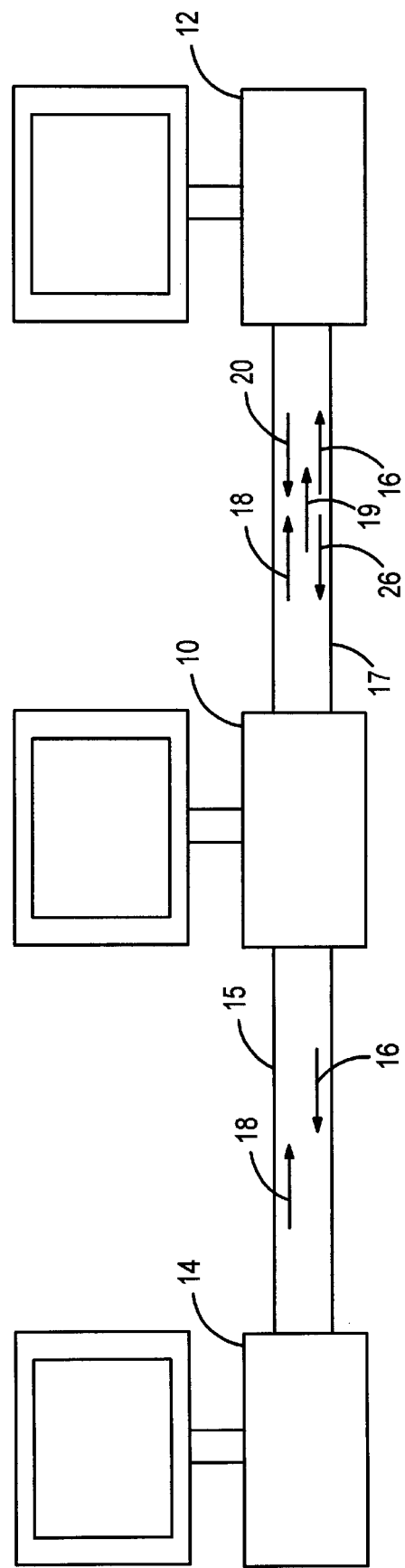
FIG. 1 is a schematic diagram illustrating a first configuration of a silent call monitoring session between an agent terminal and a supervisor terminal.

With reference to FIG. 1, a system for silent call monitoring enables a supervisor terminal 12 to monitor a first voice-over-data-network call 15, for instance a telephony-over-LAN (TOL) call, between an agent terminal 10 and a customer terminal 14. The system is most advantageously employed in a Automatic Call Distribution (ACD) system which directs incoming customer calls to multiple ACD agents (not shown). It is of importance that the agents provide a high level of customer service, and one of the ways of promoting high service levels is to provide the agents with feedback and constructive criticism of the agents' performance. The most effective means for providing feedback to an agent is to enable a supervisor to monitor calls to the agent, so that the supervisor can directly observe the agent in action. Current TOL call signaling and setup protocols, for instance the H.323 protocol, enable multipoint conferencing. However, using multipoint conferencing for silent call monitoring is wasteful of call setup and call signaling resources. The silent call monitoring system to be described below provides an efficient method for monitoring a TOL call between the agent terminal and the customer terminal.

The first TOL call 15 includes first voice data 16 in which digitized voice information is transmitted from the agent terminal 10 to the customer terminal 12, and further includes second voice data 18 which includes digitized voice information transmitted from the customer terminal to the agent terminal. The supervisor terminal 12 transmits a monitoring session request 26 to the agent terminal 10 for the purpose of establishing a monitoring session. If the monitoring session request can be fulfilled, the monitoring session will consist of either one or two monitoring calls, depending on the processing resource availability level in the agent terminal.

With continued reference to FIG. 1, a first configuration of a monitoring session is utilized in response to the monitoring session request 26 when the agent terminal 10 has an available processing resource level which is above a minimum threshold. The voice sample integration function is utilized in the silent call monitoring system to mix voice samples of first and second voice data 16 and 18 which were transmitted simultaneously in the first call. The simultaneously transmitted first and second voice data are detected to enable processing of the voice data in order to simultaneously present the first and second voice data at the supervisor terminal.

Occasionally, when the agent and customer speak simultaneously in the first call 15, first voice data 16 and second voice data 18 will be transmitted simultaneously in the first call. Voice samples from the simultaneously transmitted first and second voice data should be integrated into mixed voice samples either before or after transmission to the supervisor terminal 12 for simultaneous presentation of the agent and customer voice information at the supervisor terminal. The present invention makes efficient use of network processor resources by determining whether sufficient processor resources are available in the agent terminal to perform the voice integration function and, if sufficient resources are not available, utilizing network processor resources external to the agent terminal to perform the voice integration function.

When the monitoring session request 26 is received from the supervisor terminal 12, the agent terminal 10 determines whether it has an available processing resource level above the minimum required threshold. If the level is above the minimum threshold, the agent terminal establishes a first monitoring call over which the first and second voice data 16 and 18 will be transmitted. The agent terminal monitors the first call 15 for simultaneously transmitted first and second voice data and integrates the simultaneously transmitted first and second voice data into mixed voice data samples 19 which are then transmitted over the first monitoring call 17 to the supervisor terminal 12. The supervisor terminal is also able to transmit supervisor voice data 20 over the first monitoring call without having the customer terminal 14 receive the supervisor voice data.

Figure 2:
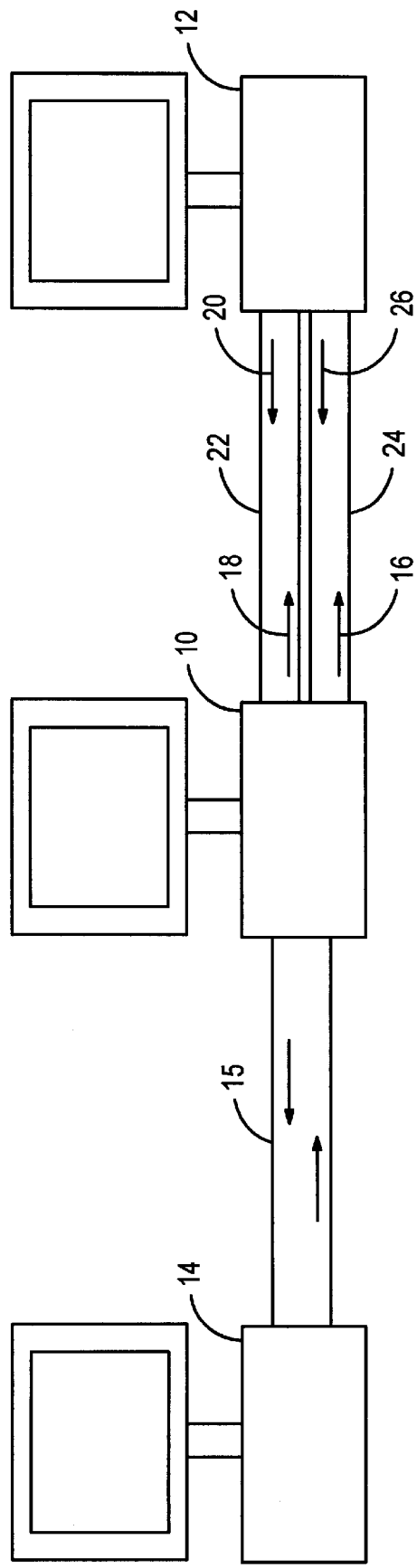
FIG. 2 is a schematic diagram of a second configuration of a silent call monitoring session between the agent terminal and the supervisor terminal.

Referring to FIG. 2, if the agent terminal 10 has a level of available processor resources, including CPU resources and DSP resources, below the minimum threshold when the agent terminal receives the monitoring session request 26, the agent terminal and the supervisor terminal 12 will cooperate to establish second and third monitoring calls 22 and 24 over which the first and second voice data 16 and 18 are transmitted in an unintegrated format, if sufficient network bandwidth is available. The agent terminal is not required to integrate voice samples from first and second voice data simultaneously transmitted over the first call 15, because the first and second voice data are separately transmitted over the second and third monitoring calls. The monitoring session is thus allowed to proceed even though insufficient processor resources are available in the agent terminal to integrate simultaneously transmitted first and second voice data samples.

A preference exists in the present invention to employ processor resources in the agent terminal to integrate voice samples of simultaneously transmitted first and second voice data, if sufficient agent terminal processor resources are available. If agent terminal processor resources are available, these resources are the most logical choice to utilize for voice data mixing because, of all network processor resources, the agent terminal resources are best positioned to perform voice data integration as the agent terminal has direct access to the first and second voice data. Consequently, because the first and second voice data need not be transmitted over two separate calls, network bandwidth is conserved. However, if sufficient agent resources are not available, rather than reject the monitoring session request, the voice data integration function is relocated to the supervisor terminal, assuming sufficient network bandwidth is available.

Figure 3:
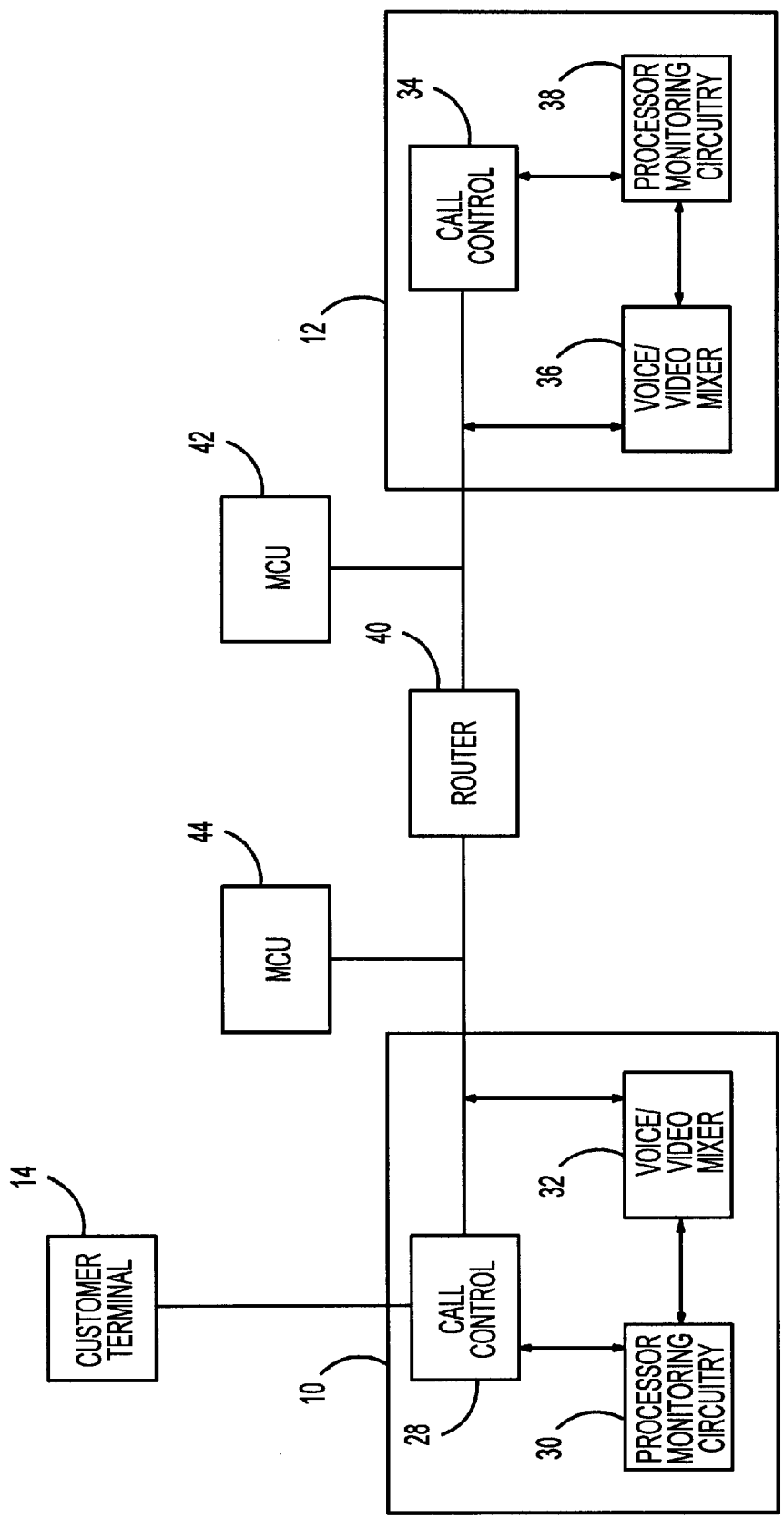
FIG. 3 is a block diagram illustrating the interrelating functional components of the agent terminal and the supervisor terminal which cooperate to establish a monitoring session.

With reference to FIGS. 1, 2 and 3, the agent terminal 10 includes a call control 28, processor monitoring circuitry 30, and a voice/video mixer 32. The supervisor terminal 12 also includes a call control 34, a voice/video mixer 36, and processor monitoring circuitry 38. The supervisor terminal call control is responsive to a user input to transmit a monitoring session request 26 to the agent terminal. The agent terminal call control 28 communicates with the agent processor monitoring circuitry 30 to determine an available processor resource level in the agent terminal. If the level is above the minimum threshold, the agent call control cooperates with the supervisor call control to establish the first monitoring call 17. The agent call control enables the agent voice/video mixer 32 for mixing of simultaneously transmitted first and second voice data samples. The agent call control 28 monitors the first call for simultaneously transmitted first and second voice data samples, and the voice/video mixer 32 integrates the simultaneously transmitted voice data samples into mixed samples for transmission over the first monitoring call.

If the agent processor monitoring circuitry 30 communicates to the agent call control 28 a processor resource availability level below the minimum threshold, the agent call control determines whether sufficient network bandwidth is available to support the second and third monitoring calls 22 and 24. In a preferred embodiment, if insufficient bandwidth is available, the agent call control 28 examines how close to the minimum threshold the available processor resource level is. If the available processor resource level is within a predetermined range of the minimum threshold, the agent call control establishes the first monitoring call and enables the agent voice/video mixer 32. Enabling the agent voice/video mixer in this context might have a deleterious effect on other applications which are running on the agent terminal 10, however, this cost is balanced against the desire to avoid having to reject the monitoring session request. The predetermined range below the minimum processing resource threshold can be set according to the relative importance a system user assigns to preserving the other applications at a high operating level in balance with the importance of avoiding rejection of monitoring session requests.

If sufficient network bandwidth is available, the second and third monitoring calls are established and the first and second voice data 16 and 18 are transmitted over the second and third monitoring calls 22 and 24 respectively. The agent processor monitoring circuitry 30 continuously monitors the level of processor resources available to the agent terminal 10 after the initial determination of resource availability is made upon receiving the monitoring session request. If after establishing the second and third monitoring calls, the agent monitoring circuitry determines that the level of available processor resources has risen above the minimum threshold, the agent call control 28 will notify the supervisor terminal 12 that transmission of the first and second voice data will proceed over either the second or the third monitoring call and for the supervisor call control to disable the supervisor voice/video mixer 36. The agent call control enables the agent voice/video mixer 32 and monitors the first call for the simultaneously transmitted first and second voice samples.

The agent monitoring circuitry 30 also continuously monitors the available processor resource level after the first monitoring call 17 has been established. If the agent terminal 10 is required to perform a processor intensive function after the first call is established, the processor resource availability level might drop below the minimum threshold. For example, if during the first call, agent and customer video streams are added to the call, the requirement that the agent voice/video mixer 32 integrate the agent and customer video streams might exceed agent processor resource capabilities. In such an event, the agent terminal 10 relocates the mixing functionality to the supervisor terminal 12 by requesting that the supervisor terminal enable the supervisor voice/video mixer 36. Additionally, an auxiliary monitoring call is established to supplement the first monitoring call. The first and second voice data are then transmitted over the first monitoring call and the auxiliary monitoring call in an unintegrated format.

The supervisor processor monitoring circuitry 38 determines whether the supervisor terminal has sufficient processor resources to perform mixing of voice and/or video samples. The determination of resource availability occurs both at the setup of the monitoring session and after the session has been established. If the supervisor terminal 12 does not have sufficient resources to perform the mixing function, it determines whether a network server is available, for instance a first multipoint control unit (MCU) 42, which is capable of performing the mixing function on behalf of the supervisor terminal. If the first MCU is available, the supervisor terminal relays the first and second voice data to the first MCU in an unintegrated format in order to have simultaneously transmitted first and second voice data integrated by the first MCU 42.

In specific situations, agent terminal 10 might utilize a second MCU 44 to perform mixing of voice and/or video samples prior to transmission to the supervisor terminal 12. For instance, if the agent terminal has insufficient resources to perform voice sample mixing, and network traffic on the supervisor terminal side of a router 40 prevents sufficient bandwidth from being available to establish the first and second monitoring calls, the agent terminal can transmit the first and second voice data in an unintegrated format to the second MCU to have the voice sample mixing performed. The second MCU is then able to transmit the first and second voice data to the supervisor terminal in a single call.

Figure 4:
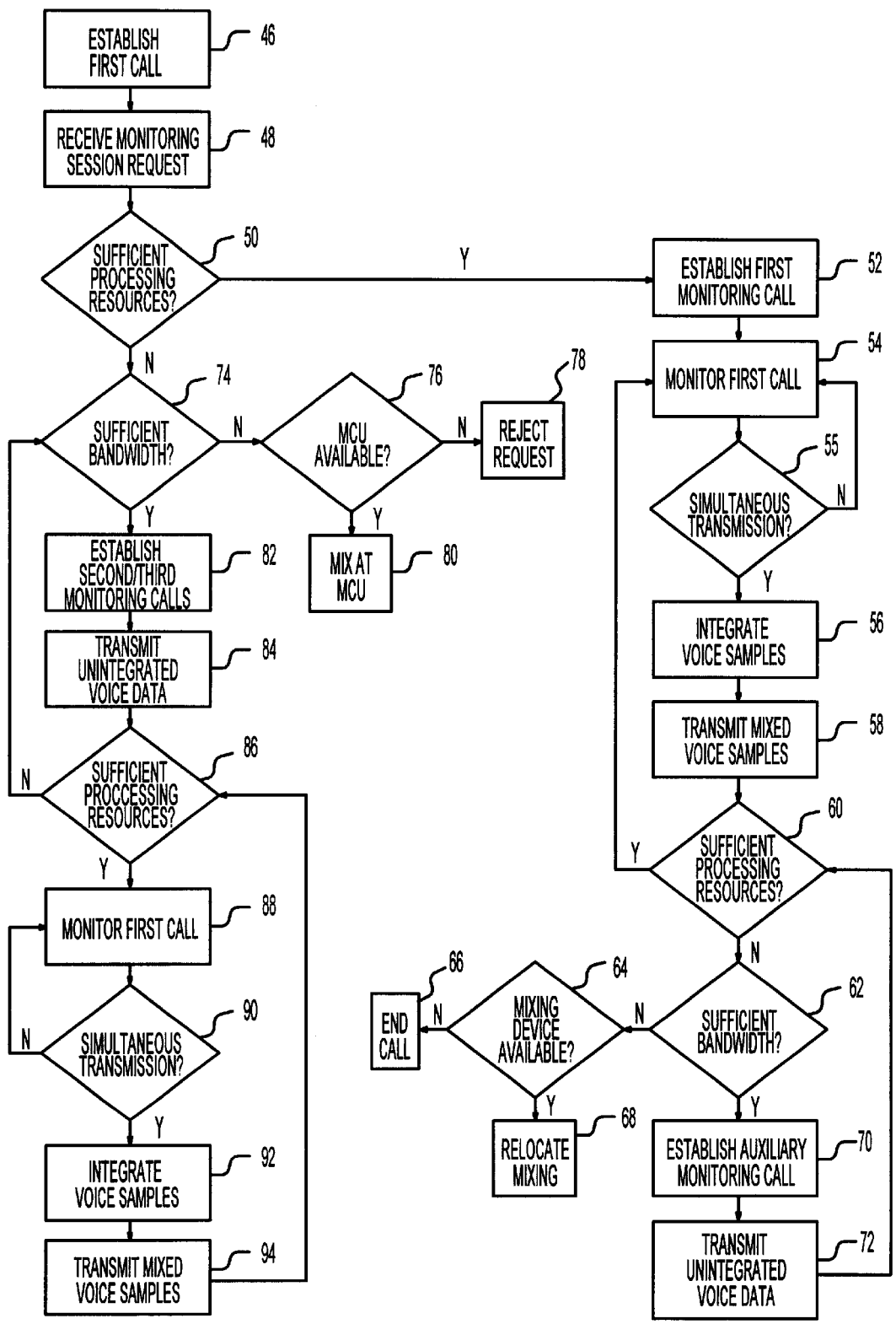
FIG. 4 is a flow diagram of a process for providing silent call monitoring with a dynamically alterable mixing location capability wherein the process flow is shown from the perspective of the agent terminal.

Referring to FIG. 4, a method for dynamically altering a voice and/or video mixing location during a silent ACD monitoring call includes the step 46 of establishing a first voice-over-data-network call between an ACD agent terminal 10 and a customer terminal 14, wherein the first call includes first voice data and/or first video data transmitted from the ACD agent and second voice data and/or second video data transmitted from the customer terminal. The agent terminal receives a request 26 for a call monitoring session from a supervisor terminal 12 in step 48. In response to the request, processor monitoring circuitry 30 of the agent terminal determines in step 50 whether sufficient processor resources are available in the agent terminal to performing mixing of digitized voice samples.

If sufficient resources are available, an agent call control 28 cooperates with a supervisor call control 34 to establish a first monitoring call 17 in step 52 over which the first and second voice data will be transmitted. The agent call control monitors the first call for simultaneously transmitted first and second voice data in step 54, and in step 55 the agent call control continuously monitors for simultaneous transmissions. If no simultaneous transmissions are detected, the first and second voice data are transmitted over the first monitoring call by the agent terminal in the order in which they were received and transmitted by the agent terminal in the first call. If the call control detects simultaneously transmitted first and second voice data, an agent voice/video mixer 32 integrates first and second voice data samples into mixed voice data samples in step 56, which are transmitted over the first monitoring call in step 58.

If sufficient processor resources are determined to be unavailable in step 50, in step 74 the agent call control 28 determines whether sufficient network bandwidth is available to support second and third monitoring calls to the supervisor terminal. If sufficient bandwidth is not available to support the second and third monitoring calls, the call control determines in step 76 if sufficient bandwidth is available to transmit the first and second voice data over two separate calls to a second MCU 44 for voice data mixing. If sufficient network bandwidth is available to transmit the first and second voice data to the MCU and the MCU has sufficient processor resources to mix the simultaneously transmitted data, the second and third voice data are transmitted to the MCU, so that any simultaneously transmitted voice data can be mixed in step 80. If the first MCU is not available to perform the mixing, the monitoring session request is rejected in step 78. If at step 74 sufficient bandwidth is available to setup the second and third monitoring calls 22 and 24, the agent call control 28 cooperates with the supervisor call control 34 to establish the second and third monitoring calls in step 82 and the first and second voice data are transmitted over the second and third monitoring calls in an unintegrated format in step 84.

After the initial determination in step 50 of whether there are sufficient processor resources in the agent terminal to perform mixing of digitized voice samples, the agent processor monitoring circuitry 28 continues to monitor agent processor resources regardless of the initial determination. Thus, even if the mixing of voice samples might be initially performed at the agent terminal, if the available processing resource level in the agent terminal drops below the minimum threshold, the mixing location will be moved to a remote site, perhaps to the supervisor terminal.

In step 60, after the first monitoring call has been established, the agent terminal 10 determines whether sufficient processor resources are still available to continue mixing first and second voice data samples at the agent terminal. If sufficient resources continue to be available, the agent call control 34 continues to monitor the first call for simultaneously transmitted first and second voice data. If, on the other hand, available agent processor resources have fallen below the minimum threshold (e.g., an agent video stream and a customer video stream have been added to the first call 15, thereby increasing agent processing resource requirements for the first monitoring call 17), the agent call control determines in step 62 if sufficient network bandwidth is available for establishing an auxiliary monitoring call. The auxiliary monitoring call is used to supplement the first monitoring call such that first voice data is transmitted over the first monitoring call in an unintegrated format and second voice data is transmitted over the second monitoring call in an unintegrated format.

If at step 62 insufficient bandwidth is available to establish the auxiliary monitoring call to the supervisor terminal 12, in step 64 the agent call control determines whether sufficient bandwidth is available to transmit the first and second voice data over two separate calls to a second MCU 44 for mixing of simultaneously transmitted first and second voice data. If the second MCU is available, in step 68 the voice data mixing function is relocated to the second MCU. If the second MCU is not available to perform voice mixing, insufficient network bandwidth is available to establish the auxiliary call, and insufficient processor resources are available to continue voice mixing at the agent terminal, then in step 66 the monitoring call is terminated or a portion of the monitoring call is terminated. For example, if the first call includes both voice and video streams, the agent terminal might cease video transmission in the monitoring call. If sufficient network bandwidth is available to establish the auxiliary call, in step 70 the auxiliary call is established and the first and second data are transmitted over the first monitoring call and the auxiliary monitoring call in an unintegrated format, as shown in step 72.

In step 86, the agent processor monitoring circuitry 30 also continues to monitor the level of available processor resources after the establishment of the second and third monitoring calls 22 and 24 in step 82. If the level of available processor resources remains below the minimum threshold, the agent processor monitoring circuitry 30 continues to monitor network bandwidth to ascertain that sufficient bandwidth remains available to support the second and third monitoring calls. If the level rises above the minimum threshold because, for example, agent and customer video streams are deleted from the first call or the agent terminal stops running a processor resource-intensive application, the agent call control 28 enables the agent voice/video mixer 32 and initiates step 88 to monitor the first call 15 for simultaneously transmitted first and second voice data. In step 90, the call control determines whether a simultaneous transmission has occurred. If no simultaneous transmission is detected, the agent call control continues to monitor the first call 15. If a simultaneous transmission is detected, the agent video/voice mixer 32 integrates first voice data samples with second voice data samples in step 92, and in step 94 the mixed voice data samples (and mixed video data samples, if applicable) along with unintegrated first and second voice data are transmitted over a single call, either the second or third monitoring call. The agent processor monitoring circuitry 30 continues to monitor the available processor resource level throughout the entire monitoring session.

Figure 5:
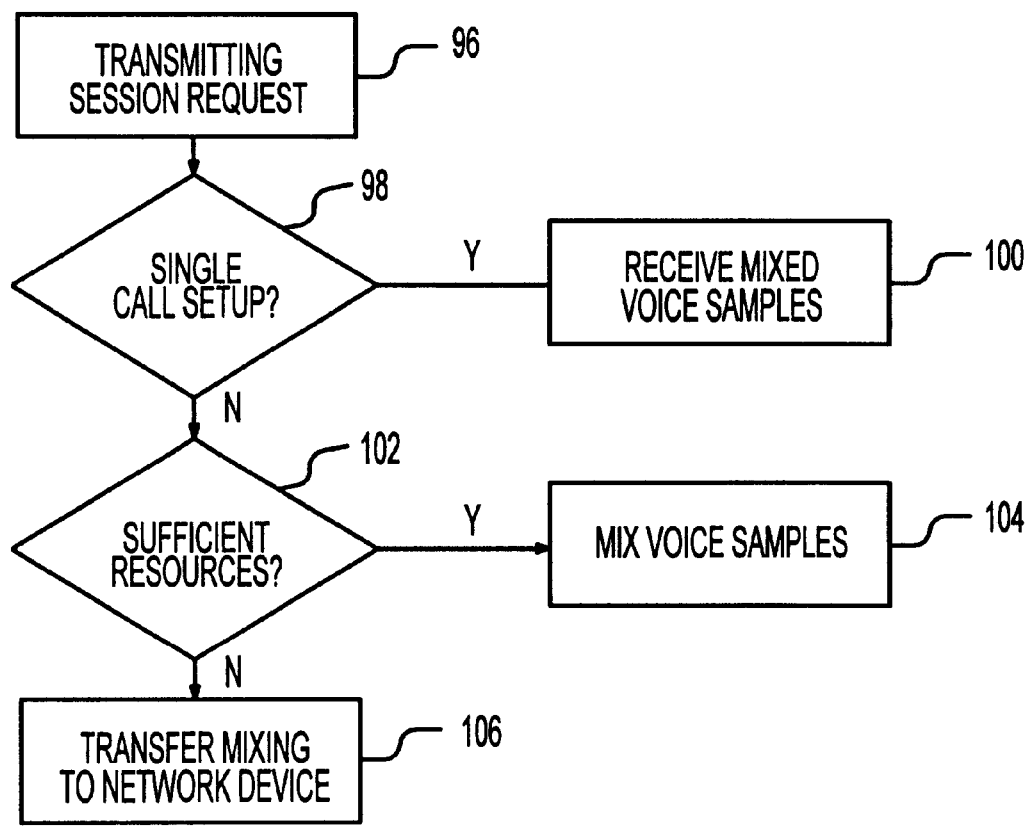
FIG. 5 is a flow diagram of a process for implementing silent call monitoring with the dynamically alterable mixing location capability shown from the perspective of the supervisor terminal.

With reference to FIG. 5, a monitoring session from the perspective of the supervisor terminal 12 includes transmitting a monitoring session request in step 96. In step 98, after the request has been transmitted, the supervisor call control 34 determines whether the agent terminal will perform the mixing locally and establish the first monitoring call, or whether the agent terminal will require the supervisor terminal to handle the voice mixing function. If the agent terminal performs the mixing function, in step 100 the supervisor terminal receives the mixed voice samples. If the agent terminal requires the supervisor terminal to handle the voice mixing function, the supervisor processor resource monitoring circuitry assesses in step 102 whether sufficient supervisor processor resources are available to perform voice data sample mixing at the supervisor terminal. If sufficient resources are available, the supervisor call control enables the supervisor voice/video mixer 36 and in step 104 the mixer integrates simultaneously transmitted first and second voice data. If insufficient supervisor processor resources are available, in step 106 the supervisor terminal relays the first and second voice data to the first MCU to perform the voice data mixing function.

What is claimed is:

1. A method for dynamically altering a voice sample integrating location during a first voice-over-data-network call which includes first voice data transmitted from a first terminal and second voice data transmitted from a second terminal comprising the steps of:
   monitoring said first call for first voice samples of said first voice data transmitted from said first terminal simultaneously with transmission of second voice samples of said second voice data from said second terminal;
   determining whether sufficient first processing resources are available to said first terminal to integrate said first voice samples with said second voice samples;
   integrating said first voice samples with said second voice samples into mixed voice samples at said first terminal if said sufficient first processing resources are available;
   transmitting said mixed voice samples to a supervisor terminal in a first monitoring voice-over-data-network call;
   if said sufficient first processing resources are not available at said first terminal, determining whether sufficient network bandwidth is available to establish second and third monitoring voice-over-data-network calls to said supervisor terminal;
   if said sufficient network bandwidth is available, establishing said second and said third monitoring calls; and
   transmitting said first voice data and said second voice data in an unintegrated format to said supervisor terminal over said second and said third monitoring calls.

2. The method of claim 1 further comprising the steps of:
   monitoring a level of said first processing resources available to said first terminal after said second and said third monitoring calls have been established;
   if said available first processing resources exceed a first predetermined minimum threshold level after said second and said third monitoring calls are established, reconfiguring voice processing assignment such that said first voice samples and said second voice samples are mixed at said first terminal; and
   transmitting said mixed voice samples to said supervisor terminal in one of said second and said third monitoring calls.

3. The method of claim 1 further comprising the step of:
   monitoring a level of second processing resources available to said supervisor terminal after receiving said first and said second voice data in said second and third monitoring calls;
   if said level of said second processing resources falls below a second predetermined minimum threshold level, determining whether a first network device is available to said supervisor terminal to integrate said first voice samples and said second voice samples; and
   reconfiguring voice processing assignment such that integration of said first and said second voice samples occurs at said first network device if said level of said second processing resources falls below said second predetermined minimum threshold level and said first network device is available.

4. The method of claim 1 further comprising the steps of:
   if said sufficient first processing resources are not available to said first terminal and said sufficient network bandwidth is unavailable, determining whether a second network device, capable of integrating said first voice samples with said second voice samples, is available to said first terminal; and
   if said second network device is available to said first terminal, reconfiguring voice processing assignment such that integration of said first and said second voice data samples occurs at said second network device to form said mixed voice samples prior to transmitting said mixed voice samples to said supervisor terminal.

5. The method of claim 1 further comprising the steps of:
   monitoring a level of said first processing resources available to said first terminal after said step of transmitting said mixed voice samples; and
   if said level of said first processing resources falls below a first predetermined minimum threshold, establishing an auxiliary voice-over-data-network call to said supervisor terminal;
   relocating said integrating of said first and said second voice samples to said supervisor terminal; and transmitting said first voice data and said second voice data to said supervisor terminal in said first monitoring and said auxiliary calls in the absence of integrating said first voice samples with said second voice samples.

6. The method of claim 1 wherein said step of determining whether said sufficient first processor resources are available includes determining whether sufficient central processor resources are available and whether sufficient digital signal processor resources are available.

7. A system for enabling dynamic relocation of a voice sample integration site in a telephony-over-data-network environment comprising:
an agent terminal responsive to a first remote call-setup request to establish a first voice-over-data-network call to a remote terminal wherein said first call includes first voice data transmitted from said agent terminal and second voice data transmitted from said remote terminal, said agent terminal comprising:
 a) means for activating first and second agent terminal operating modes, said first mode being activated in response to a processing resource availability level in said agent terminal below a first minimum threshold of processing resources required for integrating digitized voice data samples, said second mode being activated in response to a processing resource availability level in said agent terminal above said first minimum threshold;
 b) means for detecting a first quantity of said first voice data transmitted over said first call simultaneously with a second quantity of said second voice data;
 c) integrating means, enabled upon activation of said first mode, for integrating said first quantity of voice data with said second quantity of voice data to form integrated voice samples;
 d) means, responsive to activation of said second mode, for remotely enabling integration of said first and said second quantities of voice data in remote devices; and
 e) means for transmitting voice data over a data network, said transmitting means being configured to transmit said integrated voice samples over said data network during activation of said first mode, and to transmit said first and said second voice data in an unintegrated format over said data network during activation of said second mode.

8. The system of claim 7 further comprising means for establishing monitoring voice-over-data-network calls, said establishing means being responsive to reception of a monitoring session request during activation of said first mode to establish a first monitoring call, said establishing means being responsive to reception of said monitoring session request during activation said second mode to establish second and third monitoring voice-over-data-network calls, said transmitting means being configured to transmit said integrated voice samples over said first monitoring call during activation of said first mode and to transmit said first and said second voice data over said second and third monitoring calls in said unintegrated format during activation of said second mode.

9. The system of claim 8 further comprising a supervisor terminal in communicative contact with said agent terminal and responsive to a user input to transmit said monitoring session request to said establishing means, wherein said supervisor terminal includes voice data integrating circuitry responsive to said agent terminal enabling means to integrate said first and said second voice data quantities received from said agent terminal.

10. The system of claim 8 wherein said agent terminal further comprises:
means for determining network bandwidth availability, said determining means being responsive to reception of said monitoring session request during said first mode to determine if sufficient network bandwidth is available to establish said second and said third monitoring calls, said agent terminal being configured to reject said monitoring session request if said sufficient network bandwidth is unavailable.

11. The system of claim 9 wherein said activating means is configured to activate said first agent operating mode after establishment of said first monitoring call in response to a decrease in said processing resource availability level below said first minimum threshold, said activating means being further configured to activate said second mode after establishment of said second and third monitoring calls in response to an increase in said processing resource availability above said first minimum threshold.

12. The system of claim 9 wherein said supervisor terminal further comprises:
monitoring circuitry configured to detect a second processing resource availability minimum threshold required by said supervisor terminal to integrate voice data samples; and
second enabling means, responsive to detection by said monitoring circuitry of a second processing resource availability level below said second processing minimum threshold, for remotely enabling voice data integrating functionalities in remote devices.

13. The system of claim 7 wherein said first minimum threshold represents a processing resource availability level required for integrating digitized video data and said digitized voice data samples, said detecting means being configured to detect a first quantity of video data transmitted by said agent terminal over said first remote call simultaneously with transmission of a second quantity of video data from said remote terminal, said integrating means being configured to integrate said first quantity of video data with said second quantity of video data to form integrated video samples, and said transmitting means being configured to transmit said integrated video samples over said first monitoring call and to transmit said first and said second quantity of said video data in an unintegrated format over said second and third monitoring calls.

14. A method for enabling dynamic relocation of a data mixing functionality in a telephony-over-data-network environment which includes an Automatic Call Distributor (ACD) system, the method comprising the steps of:
establishing a customer voice-over-data-network call between an ACD agent terminal and a customer terminal wherein the customer call includes agent voice data transmitted from said ACD agent terminal and customer voice data transmitted from said customer terminal;
receiving a monitoring session request from an ACD supervisor terminal;
determining whether said agent terminal has an available processing resource level above a first minimum threshold;
if said agent terminal has said available processing resource level above said first minimum threshold, enabling a first operational mode in said agent terminal including:
 a) establishing a first monitoring voice-over-data-network call;

b) monitoring said customer call for a first quantity of said agent voice data transmitted simultaneously with transmission of a second quantity of said customer voice data;
c) integrating said agent voice data quantity with said second customer voice data quantity at said agent terminal to form integrated voice samples; and
d) transmitting said integrated voice samples over said first monitoring call; and if said agent terminal has an available processing resource level below said first minimum thresholds enabling a second operational mode in said agent terminal including:
a) establishing second and third monitoring voice-over-data-network calls to said supervisor terminal; and
b) transmitting said first voice data quantity and said second voice data quantity over said second and third monitoring calls in an unintegrated format;

determining if said supervisor terminal has sufficient available processing resources to integrate said first and said second voice data quantities; and integrating said first and said second voice data quantities at said supervisor terminal if said sufficient resources are available in said supervisor terminal and insufficient resources are available in said agent terminal.

15. The method of claim 14 further comprising the step of transmitting said first agent voice data quantity and said second customer voice data quantity to a network device capable of integrating said first and said second voice data quantities if said sufficient processing resources are not available in said supervisor terminal.

16. The method of claim 14 further comprising the steps of:

monitoring said available processing resource level in said agent terminal after said step of establishing said first monitoring call;

if said available processing resource level falls below said first minimum threshold after said step of establishing said first monitoring call, relocating said integrating of said first quantity of said agent voice data and said second quantity of said customer voice data to a remote site, said relocating including:
a) terminating said integration of said first and said second voice data quantities at said agent terminal;
b) establishing an auxiliary monitoring voice-over-data-network call between said agent terminal and said supervisor terminal; and
c) transmitting said first and said second voice data quantities over said first and said auxiliary monitoring calls in an unintegrated format.

17. The method of claim 16 further comprising the steps of:

monitoring said available processing resource level in said agent terminal after said step of establishing said second and said third monitoring calls;

if said available processing resource level exceeds said first minimum threshold during said second and third monitoring calls, enabling a third agent operating mode including:
a) monitoring said customer call for said first quantity of said agent voice data and said second quantity of said customer voice data;
b) integrating said first agent voice data quantity with said second customer voice data quantity at said agent terminal to form said integrated voice samples; and
c) transmitting said integrated voice samples over one of said second and said third monitoring calls.

18. The method of claim 14 wherein said step of establishing said customer call includes enabling video data transmission between said agent and customer terminals, said step of determining whether said agent terminal has said available processing resources above said first minimum threshold takes into account a processing resource level required for integrating digitized video data, said step of monitoring said customer call for said simultaneous transmission includes monitoring for a first quantity of video data transmitted from said agent terminal simultaneously with transmission from said customer terminal of a second quantity of video data, and said step of integrating said first voice data quantity with said second voice data quantity includes integrating said first video data quantity with said second video data quantity.

19. The method of claim 14 wherein said step of determining whether said agent terminal has an available processing resource level above said first minimum threshold includes determining whether said agent terminal has sufficient central processing unit (CPU) resources and digital signal processing (DSP) resources.

* * * * *